US006832231B1

United States Patent
Jiang et al.

(10) Patent No.: US 6,832,231 B1
(45) Date of Patent: Dec. 14, 2004

(54) MULTIPLE WIDTH RANDOM NUMBER GENERATION

(75) Inventors: Xueping Jiang, Cupertino, CA (US); Ming Qu, San Jose, CA (US); Ji Zhao, San Jose, CA (US)

(73) Assignee: Lattice Semiconductor Corp., Hillsboro, OR (US)

( * ) Notice: Subject to any disclaimer, the term of this patent is extended or adjusted under 35 U.S.C. 154(b) by 617 days.

(21) Appl. No.: 09/966,967

(22) Filed: Sep. 28, 2001

(51) Int. Cl.[7] ............................................... G06F 7/58

(52) U.S. Cl. ..................................................... 708/252

(58) Field of Search ............................... 708/250, 252, 708/256; 380/46

(56) References Cited

U.S. PATENT DOCUMENTS

| | | | | | |
|---|---|---|---|---|---|
| 4,847,800 | A | * | 7/1989 | Daane ........................ | 708/250 |
| 5,390,189 | A | * | 2/1995 | Tateishi ...................... | 714/728 |
| 5,398,284 | A | * | 3/1995 | Koopman et al. ............ | 380/28 |
| 6,252,958 | B1 | * | 6/2001 | Rose ........................... | 380/28 |
| 6,510,228 | B2 | * | 1/2003 | Rose ........................... | 380/46 |

* cited by examiner

Primary Examiner—Tan V. Mai

(57) ABSTRACT

Method and system for generating a multiple width (e.g., 16-bit width) pseudo-random number (PRN). Each of first and second 8-bit width PRNs is generated, using first and second LFSR configurations that incorporate first and second characteristic polynomials, at least one of which is irreducible. The first and second 8-bit PRNs are generated on a rising edge and on a falling edge, respectively, of a clock signal. The first and second 8-bit PRNs are combined by concatenation or by interleaving to form a 16-bit, or other multiple width, PRN.

10 Claims, 3 Drawing Sheets

MULTIPLE WIDTH RANDOM NUMBER GENERATION

FIELD OF THE INVENTION

This invention relates to random number generation in a digital system.

BACKGROUND OF THE INVENTION

Certain communications buses can receive and transfer 16 bits of data per clock cycle. Pseudo-random-numbers (PRNs) are conventionally generated as 8 bits per clock cycle by a linear feedback shift register (LFSR), which cannot meet the throughput requirements for a 16-bit cycle.

What is needed is a system that generates a 16-bit PRN per clock cycle, utilizing the reliable technology developed to provide 8-bit PRNs. Preferably, this approach should be flexible and allow use of a variety of characteristic equations with corresponding LFSR configurations.

SUMMARY OF THE INVENTION

These needs are met by the invention, which simultaneously generates and concatenates or interleaves two 8-bit PRNs within a single clock cycle. A first 8-bit PRN component is generated by a first eight-bit PRN device on a rising clock signal; a second 8-bit PRN component is generated on a falling clock signal of the same cycle by a second, independent eight-bit PRN device; and the two 8-bit PRN components are concatenated or interleaved to provide a 16-bit PRN that is issued for that clock cycle. The characteristic polynomials used for the first and second eight-bit PRN devices are preferably the same but may be independently chosen, as long as at least one polynomial is irreducible.

DESCRIPTION OF BEST MODES OF THE INVENTION

Figure 1:
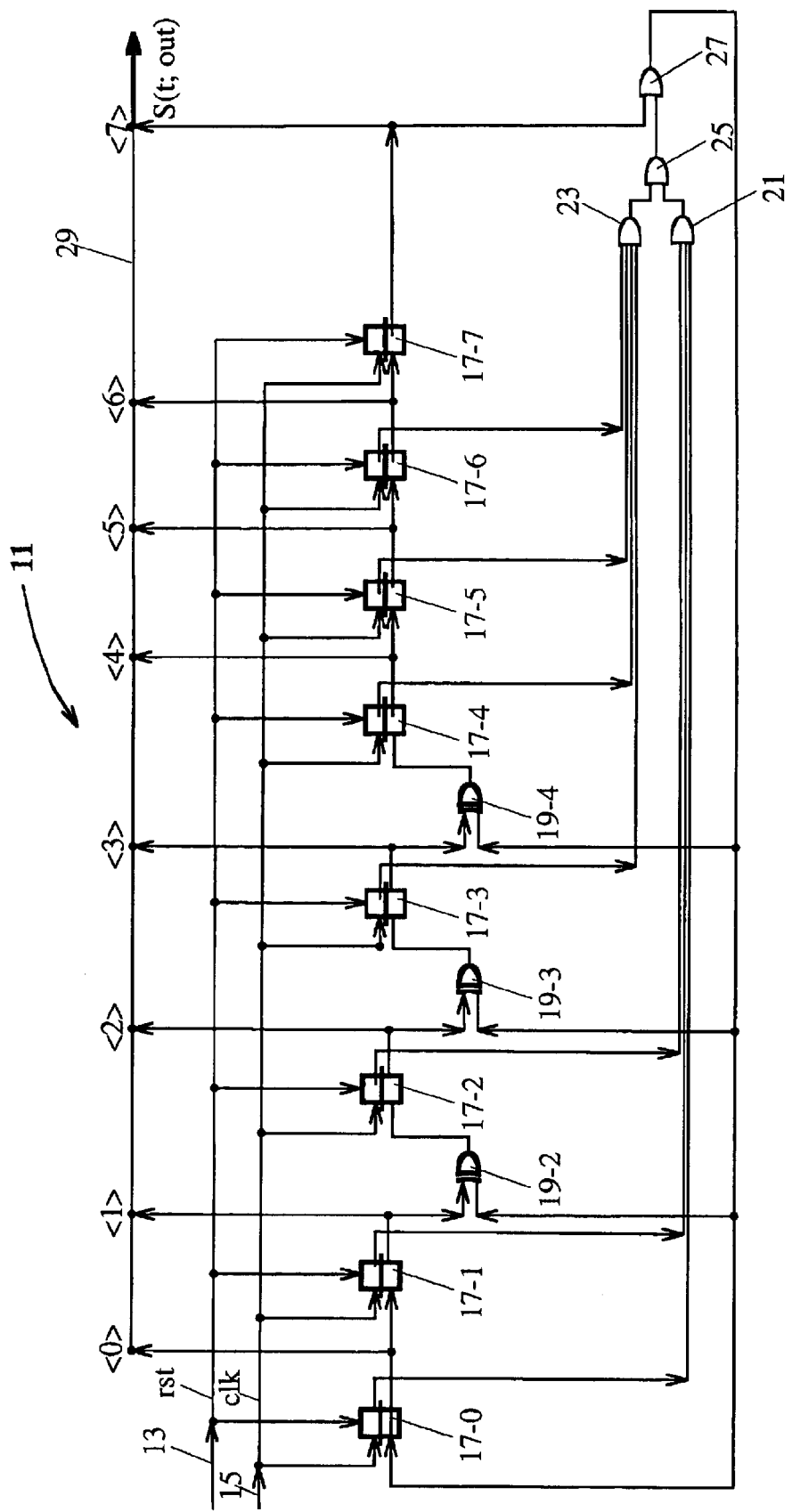
FIG. 1 schematically illustrates conventional generation of an 8-bit PRN.

FIG. 1 schematically illustrates a conventional system 11 for generating an 8-bit PRN within one clock cycle, using type D flipflops that are triggered on a rising clock signal edge. The particular LFSR configuration shown in FIG. 1 corresponds to the characteristic polynomial $$p1(x;8)=1+x^2+x^3+x^4+x^8, \quad (1)$$

where x is an unspecified element of a field and a "1" coefficient (always present) for the highest degree ($x^8$) indicates that this stage is connected to a stage in another level. The system 11 shown in FIG. 1, corresponding to the characteristic polynomial p(x;8) in Eq. (1), has 255 different non-zero value n-tuples (v0,v1,v2,v3,v4,v5,v6,v7) (with n=8) and has a minimum cycle length of 255. The cycle generated by this LFSR system is irreducible in the sense that the polynomial p1 (x;8) cannot be expressed as the product of two or more polynomials of degree less than 8. S. B. Wicker, in *Error Control Systems for Digital Communication and Storage*, Prentice Hall, Upper Saddle River, N.J., 1995, pp. 445–447, lists 16 degree-8 irreducible polynomials:

$p(x;8)=1+x^4+x^5+x^6+x^8;$ $p(x;8)=1+x^3+x^5+x^7+x^8;$ $p(x;8)=1+x^3+x^5+x^6+x^8;$ $p(x;8)=1+x^2+x^5+x^6+x^8;$ $p(x;8)=1+x^2+x^4+x^5+x^6+x^7+x^8;$ $p(x;8)=1+x^2+x^3+x^7+x^8;$ $p(x;8)=1+x^2+x^3+x^6x^8;$ $p(x;8)=1+x^2+x^3+x^5x^8;$ $p(x;8)=1+x^2+x^3+x^4+x^8;$ $p(x;8)=1+x^2+x^6+x^7+x^8;$ $p(x;8)=1+x+x^5+x^6x^8;$ $p(x;8)=1+x+x^3+x^5+x^8;$ $p(x;8)=1+x+x^2+x^7+x^8;$ $p(x;8)=1+x+x^2+x^5+x^6+x^7+X^8;$ $p(x;8)=1+x+x^2+x^3+x^6+x^7+x^8;$ and $p(x;8)=1+x+x^2+x^3+x^4+x^6+x^8. \quad (2)$ In FIG. 1, a reset signal is received or a feedback digital signal S(in) is received on an input signal line 13 and distributed to a data signal input terminal of each of eight type D flipflops (FFs), numbered 17-i (i=0, 1, . . . , 7). A clock signal CLK(t) is received on a clock input signal line 15 and is distributed to a clock input terminal each of the eight FFs 17-i. A single bit first output signal S(t;i;out1) (i=0, 1, 2) from the FF 17-i is received by one of three input terminals of an AND gate 21 that forms and issues a first intermediate output signal S(t;0/1/2;out1)=S(t;0;out1)·S(t;1;out1)·S(t;2;out1). A single bit output signal S(t;i;out) (i=3, 4, 5, 6) from the FF 17-i is received by one of three input terminals of an AND gate 23 that forms and issues a second intermediate output signal S(t;3/4/5/6;out1)=S(t;3;out1)S(t;4;out1),S(t;5;out1),S(t;6;out1). These first and second intermediate output signals are received by a two-terminal OR gate 25 that forms and issues a third intermediate output signal S(t;0/1/2/3/4/5/6;out1)=S(t;0/1/2;out1)⊕S(t;3/4/5/6;out1). An output of the OR gate 25 is received by a first input terminal of an XOR gate 27.

A complementary single-bit output signal S(t;j1;out2)=S(t;j2;out1)* is issued by the FFs 17-j1 (j1=1,2,3) and is received by a first input terminal of an XOR gate 19-(j1+1).

A complementary single-bit second output signal S(t;j2;out2)=S(t;j2;out1)*(j2=0, 4, 5, 6) is issued by the FF 17-j2 and is received by a signal input terminal of the FF 17-(j2+1). A single bit complementary output signal S(t;7;out2)=S(t;7;out1)* is issued by the FF 17-7 and is received by a second 1G input terminal of the XOR gate 27. The output signal of the XOR gate 27 is fed back to, and received by, a second input terminal of the XOR gates 19-2, 19-3 and m 194 and by the signal input terminal of the FF 17-0. The output signals S(t;j3;out2) (j3=0, 1, 2, 3, 4, 5, 6, 7), collectively referred to as S(t;out), are received in serial order by an output signal line 29 as an eight-bit pseudo-random number (PRN) from the device 11. The configuration shown in FIG. 1 provides an eight-bit PRN S(t;out) with each clock cycle. Using any of Eqs. (2) for the characteristic polynomial, the system 11 generates an ordered sequence of 255 different, non-zero value n-tuples (n=8).

Figure 2:
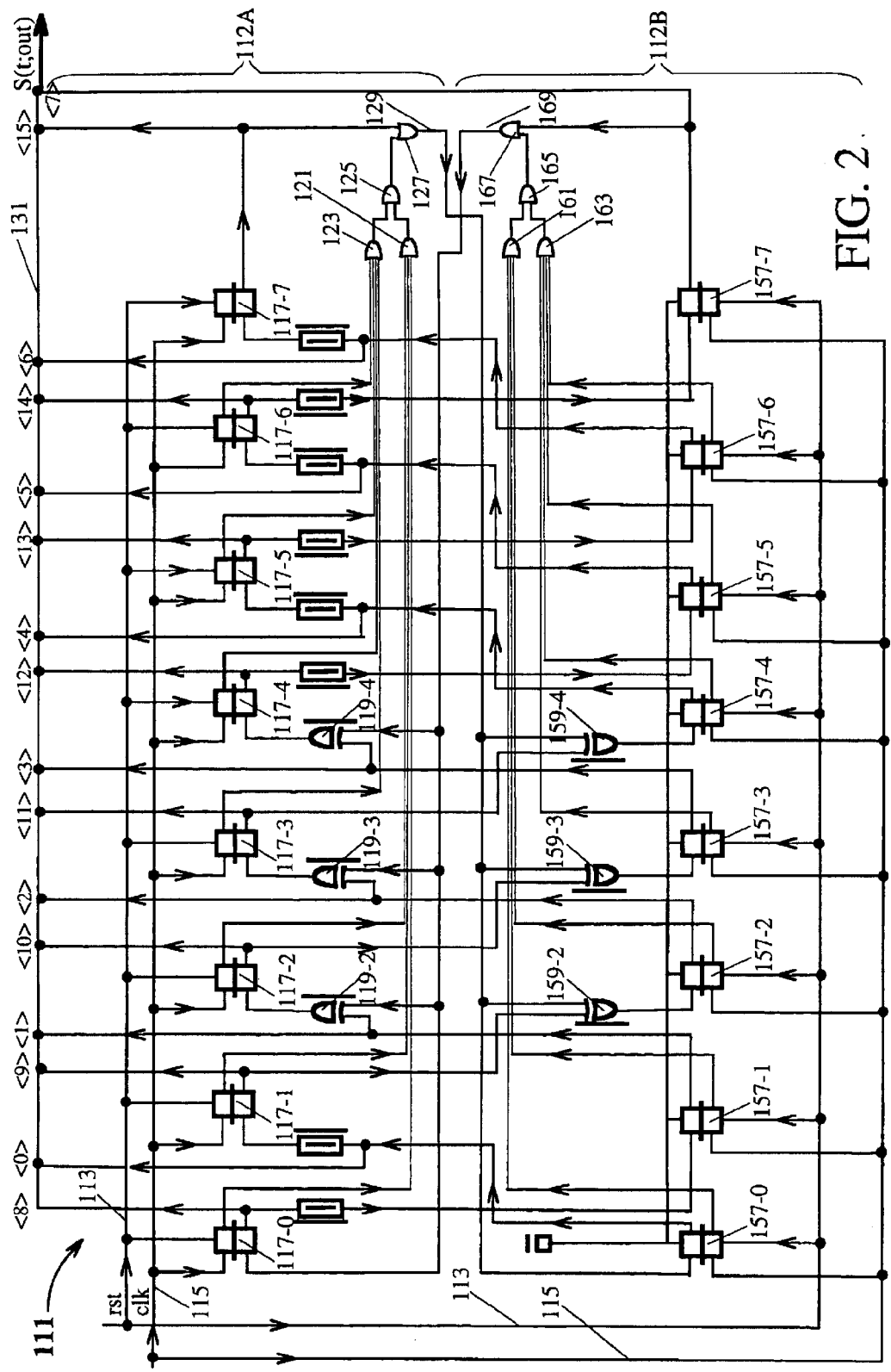
FIGS. 2 and 3 schematically illustrate generation of 16-bit PRNs according to two embodiments of the invention.

FIG. 2 schematically illustrates a system 111 for generating a 16-bit PRN S(t;out) within one clock cycle according to the invention, using a first 8-bit LFSR 112A that is triggered on a rising clock signal edge and a second 8-bit LFSR 112B that is triggered on a falling clock signal edge during the same clock cycle. The particular LFSR configurations shown in FIG. 2 correspond to the (same) irreducible characteristic polynomial, for example, $$pA(x;8)=pB(x;8)=1+x^2+x^3+x^4+x^8. \quad (3)$$

Signals for the LFSRs 112A and 112B preferably transition during a rising clock signal edge and during a falling clock signal edge, respectively, or during a falling clock signal edge and during a rising clock signal edge, respectively.

The particular irreducible characteristic polynomials, pA(x;8) and pB(x;8), set forth in Eq. (3), implemented as shown in the LFSR configurations of FIG. 2, can be replaced by a pair of degree-eight characteristic polynomials, at least one of which is irreducible. The two characteristic polynomials, pA(x;8) and pB(x;8), are preferably the same polynomial but may be different polynomials.

Each of the first LFSR configuration 112A and the second LFSR configuration 112B performs as discussed in connection with the LFSR 11 in FIG. 1. An input signal S(t;in) is received on a data input signal line 113 by at a "set" input terminal at each of a first group of FFs 117-i0 and at a "reset" input terminal at each of a second group of FFs 157-i0 (i0=0, 1, ..., 7). A clock input signal S(t;CLK) is received at a clock input terminal by each of the first and second groups of FFs.

A Q output signal from an FF 117-i1 (i1=0, 1, 2) is received by a three-input terminal AND gate 121. A Q output signal from an FF 117-i2 (i2=3, 4, 5, 6) is received by a four-input terminal AND gate 123. The output signals from the AND gates 121 and 123 are received by two input terminals of an OR gate 125, whose output signal is received by a first input terminal of an XOR gate 127.

A Q* output signal from the FF 117-0 is received at the input terminal of the FF 157-1 and by an output line 131. A Q* output signal from the FF 117-i3 (i3=1, 2, 3)) is received at a first input terminal of an XOR gate 159-(i3+1) and by the output line 131. A Q* output signal from the FF 117-i4 (i4=4, 5, 6) is received at the input terminal of the FF 157-(i4+1) and by the output line 131. A Q* output signal from the FF 117-7 is received by a second input terminal of the XOR 127 and by the output line 131.

An output signal on an intermediate line 129 from the XOR gate 127 is fed to an input signal terminal of the FF 157-0 (analogous to feedback to the first FF 17-0 in FIG. 1). This fed-back signal on the line 129 is also received and processed by a second input terminal of the XOR gates 159-i5 (i5=2, 3, 4); and the output signal of the XOR gate 159-i5 is received by a data input terminal of the FF 157-i5.

A Q output signal from the FF 157-i6 (i6=0, 4, 5, 6) is received by the FF 117-(i6+1) and by the output line 131. A Q output signal from the FF 157-i7 (i7=1, 2, 3) is received by the XOR gate 119-(i7+1) and by the output line 131. A Q* output signal from the FF 157-i8 (i8=0, 1, 2) is received by a three-input terminal AND gate 161. A Q* output signal from the FF 157-i9 (i9=3,4, 5, 6) is received by a four-input terminal AND gate 163. The output signals from the AND gates 161 and 163 are received by two input terminals of an OR gate 165, whose output signal is received by a first input terminal of an XOR gate 167. The output line 131 and a second input terminal of the XOR gate 167 receive a Q output signal from the FF 157-7. An output signal from the XOR gate 167 is received on a signal line 169 by a control or clock signal terminal of the FF 117-0.

Eight bits of a 16-bit output signal S(t;out) are provided by one output signal (Q*) from each of the FFs 117-i (i=0, 1, ..., 7), and these bits are issued on a rising clock signal (or on a falling clock signal). Another eight bits of the 16-bit output signal S(t;out) are provided by one output signal (Q) from each of the FFs 157-i (i=0, 1, ..., 7), and these bits are issued on a falling clock signal (or on a rising clock signal). Optionally, the output signals form the FFs 117-i and/or the output signals from the FFs 157-i (i=0, 1, ..., 7) are passed through delay modules with selected time delays to control any race problem that might otherwise occur. The entire 16 bits of the output signal S(t;out) are thus issued within a single clock cycle, after computation within a preceding clock cycle. The eight bits (Q*) issuing from the FFs 117-i and the eight bits (Q) issuing from the FF 157-i may be interleaved in an arbitrary manner or may be concatenated to provide a 16-bit PRN that does not repeat itself for any cycle of length at least 255 and no greater than 65,535.

The two n-tuples provided by the LFSR configurations 112A and 112B can be concatenated to provide the following concatenated sequences, among others:

$$C1=(v0,v1,v2,v3,v4,v5,v6,v7,v8,v9,v10,v11,v12,v13,v14,v15), \quad (4)$$

$$C2=(v8,v9,v10,v11,v12,v13,v14,v15,v0,v1,v2,v3,v4,v5,v6,v7). \quad (5)$$

The two n-tuples provided by the LFSR configurations 112A and 112B can be interleaved in any of 15! permutations, including the following sequences:

$$I1=(v0,v8,v1,v9,v2,v10,v3,v11,v4,v12,v5,v13,v6,v14,v7,v15), \quad (6)$$

$$I2=(v15,v1,v14,v2,v13,v3,v12,v4,v11,v5,v10,v6,v9,v7,v8,v0), \quad (7)$$

$$I3=(v5,v8,v14,v2,v3,v11,v15,v1,v13,v0,v4,v12,v9,v6,v10,v7). \quad (8)$$

The first and second LFSR configurations, 112A and 112B, include eight rising edge (positively triggered) D-flipflops and eight falling edge (negatively triggered) D-flipflops. Alternatively, the rising edge and falling edge FF signals can be exchanged with each other.

At least three unusual features are relied upon in this invention. First, feedback from a rising edge LFSR configuration is received by a falling edge LFSR configuration, and conversely. Second, The FFs within each of the first and second LFSR configurations operate without an input tap. Individually, the first and second LFSR configurations do not operate as standard LFSRs in FIG. 2. Third, at least one of (and preferably both of) the two LFSR configurations, 112A and 112B, should correspond to an irreducible polynomial, but the system will work where only one of the two characteristic polynomials is irreducible. If each of the two characteristic polynomials is a different irreducible polynomial, the minimum cycle length becomes 65,535.

The three-input and four-input AND gates, 121 and 123, or 161 and 163, in FIG. 2 can be replaced by two AND gates with m1 and 7-m1 input terminals, respectively, where m1=2, 3, 4 and 5.

Figure 3:
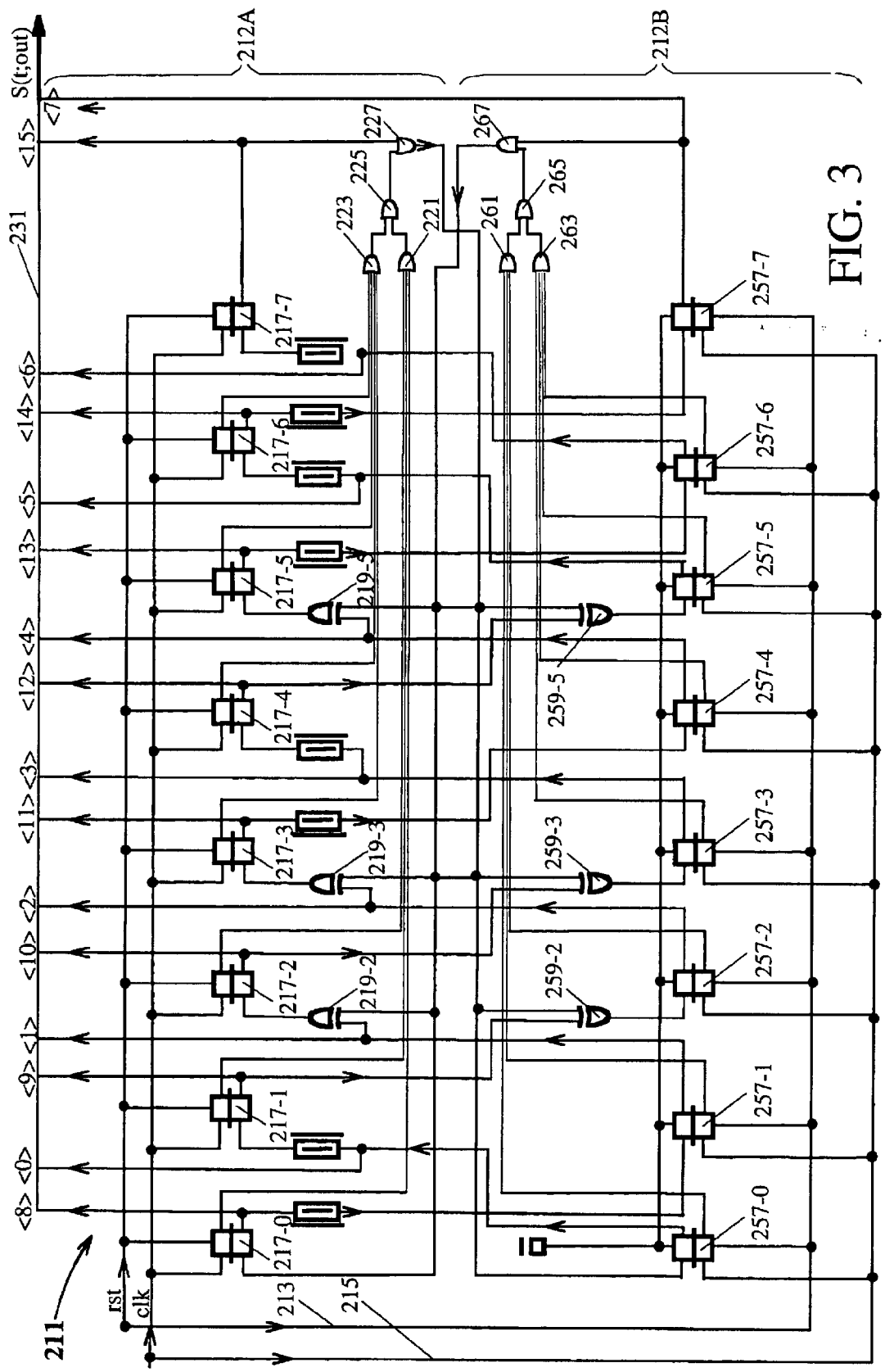

FIG. 3 schematically illustrates a system 211 for generating a 16-bit PRN S(t;out) within one clock cycle according to another embodiment of the invention, using a first 8-bit LFSR 212A that is triggered on a rising clock signal edge and a second 8-bit LFSR 212B that is triggered on a falling clock signal edge during the same clock cycle. The first and second LFSR configurations shown in FIG. 32 correspond to the respective irreducible characteristic polynomials $$pA(x;8)=1+x^2+x^3+x^5+x^8, \quad (9A)$$

$$pB(x;8)=1+x^2+x^3+x^5+x^8. \quad (9B)$$

Signals for the LFSRs 212A and 212B preferably transition during a rising clock signal edge and during a falling clock signal edge, respectively, or during a falling clock signal edge and during a rising clock signal edge, respectively. The particular irreducible characteristic polynomials, pA(x;8) and pB(x;8), set forth in Eqs. (9A) and (9B), implemented as shown in the LFSR configurations of FIG. 3, are another example of a degree-eight characteristic polynomial. Optionally, the output signals formn the FFs 217-i and/or the output signals from the FFs 257-i (i=0, 1, ... , 7) are passed through delay modules with selected time delays to control any race problem that might otherwise occur.

Each of the first lfsr configuration 212A and the second LFSR configuration 212B performs as discussed in connection with the analogous LFSRs, 112A and 112B, in FIG. 2, but with a different characteristic polynomial, set forth in eqs. (9A) and (9B).

What is claimed is:

1. A method for generating a 16-bit pseudo random number within a single clock cycle, the method comprising:

generating a first ordered sequence of eight bits on a rising edge of a clock signal, using a first linear feedback shift register (LFSR) configured to reproduce a first characteristic polynomial of degree 8;

generating a second ordered sequence of eight bits on a falling edge of the clock signal, using a second LFSR configured to reproduce a second characteristic polynomial of degree 8, where one of the first and second characteristic polynomials is irreducible; and combining the eight bits of the first sequence and the eight bits of the second sequence to provide a 16-bit sequence.

2. The method of claim 1, further comprising choosing said first and second characteristic polynomials to be irreducible and to be distinct from each other.

3. The method of claim 1, fliher comprising forming said 16-bit PRN as a selected concatenation of said first sequence and said second sequence.

4. The method of claim 1, further comprising forming said 16-bit PRN as a selected interleave of said first sequence and said second sequence.

5. The method of claim 1, further comprising drawing at least one of said first and second characteristic polynomials from the set consisting of:

$$p(x;8)=1+x^4+x^5+x^6+x^8;$$

$$p(x;8)=1+x^3+x^5+x^7+x^8;$$

$$p(x;8)=1+x^3+x^5+x^6+x^8;$$

$$p(x;8)=1+x^2+x^5+x^6+x^8;$$

$$p(x;8)=1+x^2+x^4+x^5+x^6+x^7+x^8;$$

$$p(x;8)=1+x^2+x^3+x^7+x^8;$$

$$p(x;8)=1+x^2+x^3+x^6+x^8;$$

$$p(x;8)=1+x^2+x^3+x^5+x^8;$$

$$p(x;8)=1+x^2+x^3+x^4+x^8;$$

$$p(x;8)=1+x^2+x^6+x^7+x^8;$$

$$p(x;8)=1+x+x^5+x^6+x^8;$$

$$p(x;8)=1+x+x^3+x^5+x^8;$$

$$p(x;8)=1+x+x^2+x^7+x^8;$$

$$p(x;8)=1+x+x^2+x^5+x^6+x^7+x^8;$$

$$p(x;8)-1+x+x^2+x^5+x^6+x^7+x^8; \text{ and}$$

$$p(x;8)=1+x+x^2+x^3+x^4+x^6+x^8.$$

6. A system for generating a 16-bit pseudo random number (PRN) within a single clock cycle, the system comprising:

a first linear feedback shift register (LFSR), configured to reproduce a first characteristic polynomial of degree 8 and to provide a first ordered sequence of eight bits on a rising edge of a clock signal;

a second LFSR, configured to reproduce a second characteristic polynomial of degree 8 and to provide a second ordered sequence of eight bits on a falling edge of a clock signal, where one of the first and second characteristic polynomials is irreducible; and a circuit that receives and combines the eight bits from the first LFSR and the eight bits from the second LFSR to provide a sequence of 16 bits.

7. The system of claim 6, wherein said first and second characteristic polynomials are chosen to be irreducible and to be distinct from each other.

8. The system of claim 6, wherein said 16-bit PRN as a selected concatenation of said first sequence and said second sequence.

9. The system of claim 6, wherein said 16-bit PRN as a selected interleave of said first sequence and said second sequence.

10. The system of claim 6, wherein at least one of said first and second characteristic polynomials from the set consisting of:

$$p(x;8)=1+x^4+x^5+x^6+x^8;$$

$$p(x;8)=1+x^3+x^5+x^7+x^8;$$

$$p(x;8)=1+x^3+x^5+x^6+x^8;$$

$$p(x;8)=1+x^2+x^5+x^6+x^8;$$

$$p(x;8)=1+x^2+x^4+x^5+x^6+x^7+x^8;$$

$$p(x;8)=1+x^2+x^3+x^7+x^8;$$

$$p(x;8)=1+x^2+x^3+x^6+x^8;$$

$$p(x;8)=1+x^2x^3+x^5x^8;$$

$$p(x;8)=1+x^2+x^3+x^4+x^8;$$

$$p(x;8)=1+x^2+x^6+x^7+x^8;$$

$$p(x;8)=1+x+x^5+x^6+x^8;$$

$$p(x;8)=1+x+x^3+x^5+x^8;$$

$$p(x;8)=1+x+x^2+x^7+x^8;$$

$$p(x;8)=1+x+x^2+x^5+x^6+x^7+x^8;$$

$$p(x;8)=1+x+x^2+x^3+x^6+x^7+x^8; \text{ and}$$

$$p(x;8)=1+x+x^2+x^3+x^4+x^6+x^8.$$

* * * * *

UNITED STATES PATENT AND TRADEMARK OFFICE
CERTIFICATE OF CORRECTION

PATENT NO.    : 6,832,231 B1
DATED         : December 14, 2004
INVENTOR(S)   : Xueping Jiang et al.

It is certified that error appears in the above-identified patent and that said Letters Patent is hereby corrected as shown below:

Column 5,
Line 43, "fliher" should be -- further --.

Column 6,
Line 8, "$x^5$" should be -- $x^3$ --.

Signed and Sealed this

Twenty-fourth Day of May, 2005

JON W. DUDAS
*Director of the United States Patent and Trademark Office*